US 6,546,768 B1

(12) United States Patent
Burghoff et al.

(10) Patent No.: US 6,546,768 B1
(45) Date of Patent: Apr. 15, 2003

(54) IGNITION LOCK SYSTEM FOR MOTOR VEHICLES

(75) Inventors: Heinz-Georg Burghoff, Reichenbach (DE); Hartmut Fitz, Urbach (DE); Michael Geber, Bad Urach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/385,370

(22) Filed: Aug. 30, 1999

(30) Foreign Application Priority Data

Aug. 28, 1998 (DE) .......................................... 198 39 347

(51) Int. Cl.$^7$ ............................................. B60R 25/02
(52) U.S. Cl. .................... 70/252; 70/278.3; 70/410; 70/422; 70/492
(58) Field of Search .................... 70/252, 389, DIG. 49, 70/410, 422, 278.2, 278.3, 278.7, 492

(56) References Cited

U.S. PATENT DOCUMENTS

| 1,295,351 A | * | 2/1919 | Morgan | 70/422 |
| 1,789,757 A | * | 1/1931 | Jacobi | 70/422 |
| 3,418,833 A | * | 12/1968 | Kerr | 70/389 |
| 3,633,394 A | * | 1/1972 | Pieck | 70/389 |
| 3,702,550 A | * | 11/1972 | Shimizu | 70/252 |
| 3,708,032 A | * | 1/1973 | Suzuki | 70/252 X |
| 3,789,636 A | * | 2/1974 | Nakashima | 70/252 |
| 3,969,915 A | * | 7/1976 | Droske | 70/492 |
| 4,074,547 A | * | 2/1978 | Seidewand | 70/422 X |
| 4,357,815 A | * | 11/1982 | Kleefeldt et al. | 70/492 X |
| 4,898,010 A | * | 2/1990 | Futami et al. | 70/389 X |
| 5,551,267 A | * | 9/1996 | Janssen et al. | 70/252 |
| 5,653,131 A | * | 8/1997 | Shibata et al. | 70/492 X |
| 5,836,187 A | * | 11/1998 | Janssen et al. | 70/252 |

FOREIGN PATENT DOCUMENTS

| DE | 2704478 | * | 8/1978 | 70/DIG. 49 |
| DE | 2708141 | * | 8/1978 | 70/DIG. 49 |
| DE | 33 06 863 C2 | | 7/1985 | |
| JP | 4039144 A | * | 2/1992 | 70/DIG. 49 |
| NO | 40879 | * | 2/1925 | 70/410 |

* cited by examiner

Primary Examiner—Lloyd A. Gall
(74) Attorney, Agent, or Firm—Crowell & Moring LLP

(57) ABSTRACT

An ignition lock system for a motor vehicle includes an electronic ignition key and an electronic ignition lock having a key receptacle. The electronic ignition key can be inserted into the key receptacle to exchange coded operating signals, the key receptacle, together with the inserted electronic ignition key, being movable out of an initial position into at least one operating position. A mechanical blocking device is provided in the key receptacle, which blocks the electronic ignition key against withdrawal from the key receptacle in the operating position. The mechanical blocking device cooperates with the electronic ignition key in such a way that the electronic ignition key and/or the key receptacle is irreversibly damaged when blocking actions of the mechanical blocking device are forcibly overcome.

18 Claims, 2 Drawing Sheets

IGNITION LOCK SYSTEM FOR MOTOR VEHICLES

BACKGROUND AND SUMMARY OF THE INVENTION

This application claims the priority of German patent document 198 39 347.4, filed Aug. 28, 1998, the disclosure of which is expressly incorporated by reference herein.

The invention relates to a motor vehicle ignition lock system having an electronic ignition key which can be inserted into a receptacle in an electronic ignition lock in order to exchange coded information.

Such ignition lock systems are used in motor vehicles for identifying an electronic ignition key which belongs to the electronic ignition lock. In such systems, the at least one electronic ignition key is identified by data exchange of coded operating signals between the electronic ignition lock and the electronic ignition key. The mechanical components and forms of the electronic ignition keys and the ignition locks are standardized; that is, the electronic ignition key can be inserted into any electronic ignition lock of the same type, in order to achieve more favorable manufacturing costs.

German patent document DE 33 06 863 C2 describes a generic ignition lock system, with an electronic ignition key having driver elements for a locking device, and an electronic ignition lock having a key receptacle for the electronic ignition key. Data exchange between the electronic ignition key and the electronic ignition lock takes place when the electronic ignition key is inserted into the key receptacle. The driver elements of the electronic ignition key mate with corresponding driver elements of the key receptacle for the purpose of positive engagement. An additional withdrawal protection means, which prevents withdrawal of the electronic ignition key, from the key receptacle when the key is in its turned position comes into engagement with the key only when the latter is turned, but is ineffective when the key is inserted.

It may be considered a disadvantage of this apparatus that no measures are provided to indicate that the electronic ignition lock and/or the electronic ignition key has been manipulated.

Accordingly, one object of the present invention is to provide an ignition lock system of the generic type described above, in which manipulation of the ignition lock system can be reliably detected.

This and other objects and advantages are achieved by the ignition lock system, according to the invention, in which mechanical blocking means in a key receptacle cooperate with an electronic ignition key in a blocked position of use, in such a way that the electronic ignition key and/or the key receptacle is irreversibly damaged when blocking actions of the mechanical blocking means are forcibly overcome.

In a particularly advantageous version of the invention, irreversible damage is achieved by coordination of material between the mechanical blocking means and the housing of the electronic ignition key. To this end, the mechanical blocking means or housing parts of the electronic ignition key are produced from a material which is more resistant to damage; for example, the mechanical blocking means may be produced from metal and the housing parts for the electronic ignition key from plastic. Thus, when the electronic ignition key is forcibly pulled out of the key receptacle in a blocked position of use and/or if an electronic ignition key not inserted as instructed is forcibly turned out of a blocked initial position, clearly detectable damage is caused to the key housing and/or parts of the key housing break off, so that such a manipulation can be reliably detected. So that the housing part breaks preferably at a specific point, predetermined breaking points may additionally be provided on the housing of the electronic ignition key, as indicated schematically in FIG. 1.

In an advantageous version of the invention, part of the electronic ignition key is formed as a plug and the key receptacle of the electronic ignition lock is formed as a matching plug socket. The mechanical blocking means in the key receptacle is designed to block turning and/or withdrawal of the key, and is produced from a material which is more resistant to damage, while the electronic ignition key housing part formed as a plug is produced from a material which is less resistant to damage.

The plug is inserted positively into the key receptacle when the key receptacle is in an initial position. The turn-blocking device is arranged in such a way that, in an interlocking position of the latter, if an electronic ignition key is inserted into the key receptacle in a manner other than as instructed (in particular if a plug is not inserted into the plug socket completely), a turning movement of the key receptacle within the electronic ignition lock is prevented. If an attempt is nevertheless made to overcome the blocking action of the turn-blocking means forcibly, irreversible damage to the plug of the electronic ignition key occurs due to the above-described coordination of material. If, on the other hand, an electronic ignition key is inserted as instructed (in particular if the plug is inserted into the plug socket completely), the key receptacle is released for movement.

When the key receptacle is in the initial position, the withdrawal protection device is in a release position and, outside the initial position (for example in a position of use), it blocks the electronic ignition key against withdrawal from the key receptacle. If an attempt is nevertheless made to overcome the blocking action of the withdrawal protection device forcibly, irreversible damage to the plug of the electronic ignition key occurs due to the above-described coordination of materials.

The irreversible damage depends on the nature of the act of force and may be clearly detectable traces of scratching and/or forced breaks in and/or on the plug. The turn-blocking device and the withdrawal protection device are released and secured as a result of cooperation with the external form of the plug. Due to the effect of the force of the blocking devices on the electronic ignition key, when the latter is inserted into the key receptacle of the electronic ignition lock, it is guided in a manner virtually free of play; and after being inserted as instructed, it is held in the key receptacle. The electronic ignition key is inserted correctly into the key receptacle when the plug part of the electronic ignition key is inserted completely into the plug socket of the key receptacle design. After the electronic ignition key has been inserted as instructed, the key receptacle, together with the ignition key, can be turned out of the initial position of the key receptacle into a plurality of operating positions when the electronic ignition key has been successfully identified. The operating positions of the key receptacle, together with the inserted ignition key, correspond to the various positions of a conventional ignition lock. In the operating positions, the electronic ignition key is blocked against inadvertent withdrawal from the key receptacle, by the withdrawal protection device.

The various positions of the key receptacle are detected by means of associated detectors which are designed, for example, as microswitches. In this case, the initial position of the key receptacle corresponds to the generally known ignition lock position "ignition off". A first operating position corresponds to the generally known ignition lock position "radio", while a second operating position corresponds to the generally ignition lock position "ignition on", and a third operating position corresponds to the generally known ignition lock position "engine start". Corresponding means are provided which automatically reset the key receptacle, together with the inserted electronic ignition key, into the second position of use again after an engine start.

Other objects, advantages and novel features of the present invention will become apparent from the following detailed description of the invention when considered in conjunction with the accompanying drawings.

DETAILED DESCRIPTION OF THE DRAWINGS

Figure 1:
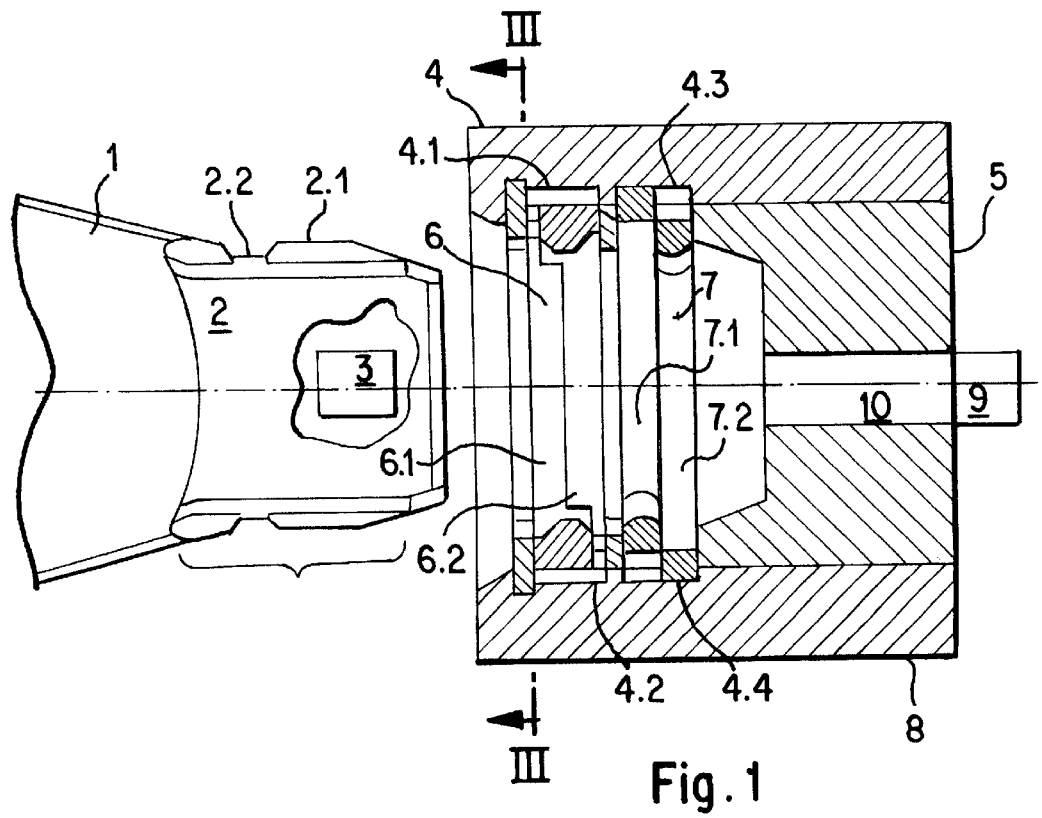
FIG. 1 is a longitudinal cross sectional view of an ignition lock system with an electronic ignition key positioned in front of the electronic ignition lock.

As shown in FIG. 1, the ignition lock system according to the invention comprises an electronic ignition key 1 with a first communication device 3 which comprises devices for encoding and decoding operating signals. Part of the electronic ignition key 1 which is designed as a plug 2 with integrally formed unlocking noses 2.1 and catch notches 2.2, is produced from a material which has a relatively smaller resistance to damage.

An electronic ignition lock 8 has an ignition lock housing 4, with a key receptacle 5 which is designed as a plug socket in the form of a rotary sleeve, with a second communication device 9 having devices for encoding and decoding coded operating signals. A withdrawal protection means 6 comprises a pair of catch slides having a first frame 6.1, a second frame 6.2 and a first pair of springs 11.1, 11.2. The two frames 6.1, 6.2 are produced from a material which has a relatively greater resistance to damage. A turn-blocking means 7 comprises a pair of blocking slides having a third frame 7.1, a fourth frame 7.2 and a second pair of springs 12.1, 12.2. The two frames 7.1, 7.2 are produced from a material which is more resistant to damage. The turn-blocking means 7 and the withdrawal protection means 6 are in each case movably mounted in a guide well 13, 14 in the key receptacle 5.

Figure 3:
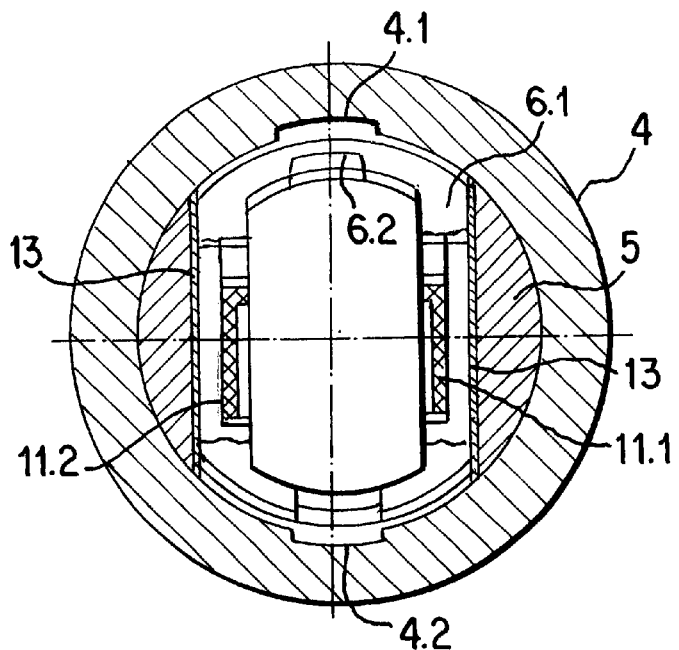
FIG. 3 is a cross section through an electronic ignition lock, taken along the sectional line III—III according to FIG. 1.

As is also apparent from FIG. 1, the electronic ignition key 1 is positioned in front of the electronic ignition lock 8 and the withdrawal protection device 6 and turn-blocking device 7 are in their initial positions. That is, the outer contours of the two frames 6.1 and 6.2 of the withdrawal protection means 6 do not project beyond the key receptacle 5 designed as a rotary sleeve. (See also FIG. 3.) The two frames 7.1 and 7.2 of the turn-blocking means 7 are displaced diametrically relative to one another and in each case one end of the two frames 7.1, 7.2, which is designed as an interlocking boss, projects beyond the circumference of the rotary sleeve and then engages into respective recesses 4.3, 4.4 in the housing 4 of the ignition lock 8, thereby preventing a turning movement of the key receptacle 5. At the same time, the interlocking boss of the third frame 7.1 engages into the third recess 4.3 and the interlocking boss of the fourth frame 7.2 engages into the fourth recess 4.4 in the housing 4 of the electronic ignition lock 8.

During the insertion of the electronic ignition key 1 into the electronic ignition lock 8 or into the key receptacle 5, the two frames 6.1, 6.2 of the withdrawal protection means 6 are displaced diametrically relative to one another by the unlocking noses 2.1 of the plug 2 of the electronic ignition key 1, counter to the spring force of the pair of springs 11.1, 11.2, out of the key receptacle 5 designed as a rotary sleeve. In each case one end of the two frames 6.1, 6.2, which is designed as an interlocking boss, projects beyond the circumference of the rotary sleeve and engages into respective recesses 4.1, 4.2 in the housing 4 of the ignition lock 8. The interlocking boss of the first frame 6.1 engages into the first recess 4.1 and the interlocking boss of the second frame 6.2 engages into the second recess 4.2.

Figure 2:
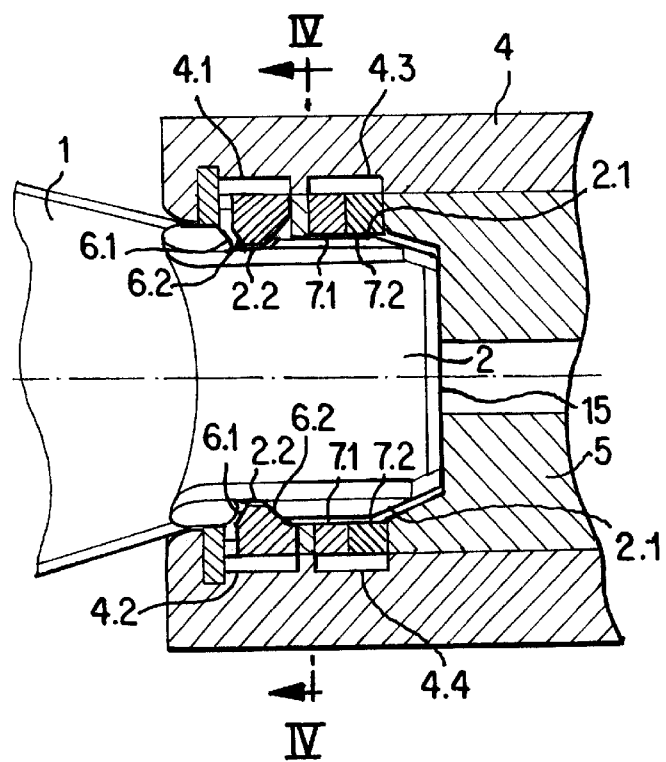
FIG. 2 is a longitudinal cross sectional view of an ignition lock system with an electronic ignition key inserted into the electronic ignition lock as instructed.
Figure 4:
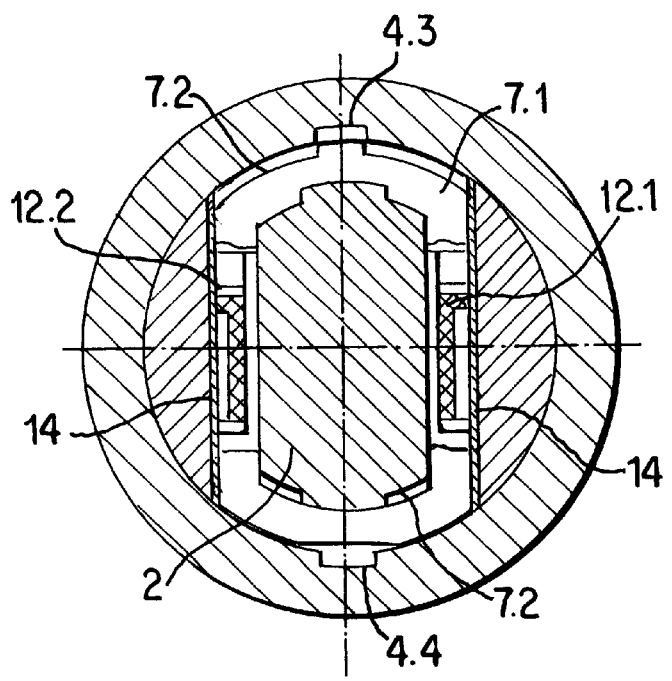
FIG. 4 is a cross section through an electronic ignition lock, with an electronic ignition lock inserted as instructed, taken along the sectional line IV—IV according to FIG. 2.

FIG. 2 shows the essential mechanical parts of the electronic ignition lock system, together with an electronic ignition key 1 inserted into the key receptacle 5 as instructed. (That is, the part of the electronic ignition key 1 which is designed as a plug 2 is inserted into the key receptacle 5 completely as far as a stop 15.) As is apparent from FIG. 2, the two frames 6.1, 6.2 of the withdrawal protection means 6 are pressed by the electronic ignition key 1 inserted as instructed, by means of the spring force of the pair of springs 11.1, 11.2, out of the recesses 4.3, 4.4 in the housing 4 of the electronic ignition lock 8 back into the key receptacle 5 designed as a rotary sleeve. The inner faces of the two frames catch into the catch notches 2.2 of the plug 2 of the electronic ignition key 1. The withdrawal protection means thus resumes its initial position according to the illustration in FIG. 1, which, with the electronic ignition key 1 inserted into the key receptacle 5, corresponds to a securing position. If, then, the key receptacle 5, together with the inserted electronic ignition key 1, is moved out of its initial position into an operating position, the ignition key 1 cannot be pulled out of the key receptacle 5, since the corresponding recesses 4.1, 4.2 in the housing 4 of the ignition lock 8 mate with interlocking bosses of the two frame 6.1, 6.2 of the withdrawal protection means 6 solely when the key receptacle 5 is in the initial position. The two frames 7.1 and 7.2 of the turn-blocking means 7 are displaced diametrically relative to one another by the unlocking noses 2.1 of the plug 2 of the electronic ignition key 1, counter to the spring force of the pair of springs 12.1 and 12.2, and pressed into the receptacle 5 designed as a rotary sleeve, the ends of the two frames 7.1, 7.2 being drawn out of the recesses 4.3, 4.4. The two frames 7.1, 7.2 are thus held in a release position by the electronic key inserted as instructed (see, in this respect, also FIG. 4).

After the electronic ignition key has been inserted as instructed, a data transfer is started in order to identify the electronic ignition key 1. For this purpose, the first communication device 3 in the electronic ignition key 1 and the second communication device 9 in the electronic ignition lock 8 exchange coded operating signals via a transmission line 10 which is designed, for example, as an optical fibre.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle ignition lock system, comprising:

an electronic ignition lock having a key receptacle;

an electronic key which is insertable into the key receptacle for an exchange of coded electronic operating signals, the key receptacle, together with the inserted electronic key, being movable out of an initial position into at least one operating position; and mechanical blocking devices provided in the key receptacle, including withdrawal prevention devices which block the electronic key against withdrawal from the key receptacle in the at least one operating position; wherein the mechanical blocking devices and the electronic key are produced from respective different materials with different damage resistance characteristics to thereby cause irreversible damage to at least one of the electronic key and the mechanical blocking devices when blocking actions of the mechanical blocking devices are forcibly overcome.

2. The ignition lock system according to claim 1, wherein the mechanical blocking devices are produced from a material which is relatively more resistant to damage, and a housing part of the electronic key is produced from a material which is relatively less resistant to damage.

3. The ignition lock system according to claim 1, wherein a housing part of the electronic key is produced from a material which is relatively more resistant to damage, and the mechanical blocking devices is produced from a material which is relatively less resistant to damage.

4. The ignition lock system according to claim 2, wherein irreversible damage of the electronic key comprises at least one of detectable scratching and breakage of said housing part of the electronic key.

5. The ignition lock system according to claim 4, wherein breaking points are provided at predetermined points of the electronic key.

6. The ignition lock system according to claim 1, wherein the mechanical blocking devices further comprise turn prevention devices for preventing movement of the key receptacle out of the initial position unless the electronic key is properly inserted into the key receptacle.

7. The ignition lock system according to claim 2, wherein the mechanical blocking devices further comprise turn prevention devices for preventing movement of the key receptacle out of the initial position unless the electronic key is properly inserted into the key receptacle.

8. The ignition lock system according to claim 3, wherein the mechanical blocking devices further comprise turn prevention devices for preventing movement of the key receptacle out of the initial position unless the electronic key is properly inserted into the key receptacle.

9. The ignition lock system according to claim 6, wherein:

the withdrawal prevention devices comprise a pair of catch slides having a first frame, a second frame and a first pair of springs, and are movably mounted in a first guide well in a key receptacle designed as a rotary sleeve;

the withdrawal prevention devices are movable into a securing position by cooperation with a matching contour of the electronic key.

10. The ignition lock system according to claim 9, wherein unlocking noses and catch notches are provided as contours on a surface of the electronic key;

when the electronic key is inserted into the key receptacle the unlocking noses displace the two frames diametrically relative to one another counter to the force of the first pair of springs and press interlocking bosses of the first and second frames into recesses in the housing of the electronic ignition lock;

when the electronic key is properly inserted, the first and second frames are pressed by the spring force of the first pair of springs into catch notches arranged behind the unlocking noses, so that interlocking bosses of the first and second frames are drawn out of the recesses again, and the first and second frames assume a securing position; and the withdrawal prevention devices are movable out of the securing position into a desecuring position only when the key receptacle is in the initial position.

11. The ignition lock system according to claim 6, wherein:

the turn prevention devices comprise a pair of blocking slides having a third frame, a fourth frame and a second pair of springs;

the turn prevention devices are movably mounted in a second guide well in the key receptacle comprising a rotary sleeve; and the turn prevention devices are unlockable by cooperation with a matching contour of the electronic key.

12. The ignition lock system according to claim 11, wherein:

when the key receptacle is in the initial position, without the electronic key inserted, the third and fourth frames are displaced diametrically relative to one another, and interlocking bosses of the third and fourth frames project out of the key receptacle and engage in recesses in the housing of the electronic ignition lock, so that the key receptacle is blocked against movement out of the initial position into at least one operating position; and unlocking noses are integrally formed on the electronic key, so that when the electronic key is properly inserted, the unlocking noses displace the third and fourth frames diametrically relative to one another into the key receptacle counter to spring force of the second pair of springs, causing the ends of the two frames to be drawn out of the recesses in the housing of the electronic ignition lock.

13. The ignition lock system according to claim 2, wherein:

said electronic key comprises a housing which has at least one predetermined breaking point; and said irreversible damage comprises a breaking of said housing at said at least one predetermined breaking point.

14. The ignition lock system according to claim 13, wherein:

said housing includes a portion formed as a plug which is insertable into the key receptacle; and said at least one breaking point is associated with said plug portion.

15. The ignition lock system according to claim 1, wherein the key and key receptacle are rotatably movable out of the initial position into the at least one operating position.

16. The ignition lock system according to claim 15, wherein the at least one operating position includes a radio position, an ignition position, and a start position, and wherein said mechanical blocking devices are operable to block the electronic key against withdrawal from the key receptacle in at least two of the operating positions.

17. The ignition lock system according to claim 16, wherein said mechanical blocking devices are operable to block the electronic key against withdrawal from the key receptacle in all three of the operating positions.

18. A motor vehicle ignition lock system, comprising:

an electronic ignition lock having a key receptacle;

an electronic key which is insertable into the key receptacle for an exchange of coded electronic operating signals, the key receptacle, together with the inserted electronic key, being movable out of an initial position into at least one operating position; and mechanical blocking devices provided in the key receptacle, including withdrawal prevention devices which block the electronic key against withdrawal from the key receptacle in the at least one operating position; wherein at least one of the mechanical blocking devices and the electronic key are produced from respective different materials with different damage resistance characteristics to thereby cause irreversible damage to at least one of the electronic key and the at least one of the mechanical blocking devices when blocking actions of the mechanical blocking devices are forcibly overcome.

* * * * *